United States Patent [19]

Ishida et al.

[11] Patent Number: 4,612,888
[45] Date of Patent: Sep. 23, 1986

[54] DIESEL ENGINE

[75] Inventors: Shiro Ishida, Fujisawa; Yoshihiko Sato, Aso; Isao Konagaya, Kugenuma, all of Japan

[73] Assignee: Isuzu Motors Limited, Tokyo, Japan

[21] Appl. No.: 661,532

[22] Filed: Oct. 16, 1984

[30] Foreign Application Priority Data

Oct. 18, 1983 [JP] Japan ................................. 58-193477

[51] Int. Cl.⁴ .............................................. F02B 19/08
[52] U.S. Cl. .................................... 123/261; 123/263; 123/280
[58] Field of Search ............... 123/261, 262, 263, 275, 123/280

[56] References Cited

U.S. PATENT DOCUMENTS 2,858,810  11/1958  Hoffmann ........................... 123/263

FOREIGN PATENT DOCUMENTS 1048437  1/1959  Fed. Rep. of Germany ...... 123/275
26052    7/1915  Norway .............................. 123/275
140741   6/1953  Sweden .............................. 123/262
847675   9/1960  United Kingdom ............... 123/262

*Primary Examiner*—Andrew M. Dolinar
*Attorney, Agent, or Firm*—Cullen, Sloman, Cantor, Grauer, Scott, & Rutherford

[57] ABSTRACT

A diesel engine has a cylinder head, an auxiliary combustion chamber defined in the cylinder head, an atomization passage communicating with the auxiliary combustion chamber, and a fuel injection nozzle means mounted in the cylinder head and having a primary injection port opening into the auxiliary combustion chamber and a secondary injection port opening toward an inner wall surface of the atomization passage. When the diesel engine is under a low load, fuel is injected from the secondary injection port toward the inner wall surface of the atomization passage while fuel is prevented from being injected from the primary injection port, for thereby causing fuel to flow along an inner wall surface of the auxiliary combustion chamber, which is positioned downstream in the direction in which a swirl flows.

4 Claims, 7 Drawing Figures

000
DIESEL ENGINE

BACKGROUND OF THE INVENTION

1. Field of the Invention

The present invention relates to a diesel engine, and more particularly to a diesel engine having an auxiliary combustion chamber such as a swirl combustion chamber or a precombustion chamber, wherein the combustion under a low load such as upon idling is slowed to lower the rate of a pressure buildup within the cylinder for thereby reducing noise and vibrations to a large extent.

2. Description of the Prior Art

FIG. 1 of the accompanying drawings illustrates a conventional diesel engine having a swirl combustion chamber 2 defined in a cylinder head 1 mounted on a cylinder block (not shown). The swirl combustion chamber 2 communicates with a main combustion chamber 3 defined in the cylinder block. When a piston is moved upwardly in the main combustion chamber 3, compressed intake air flows into the swirl combustion chamber 3 to generate a swirl S therein. The swirl combustion chamber 3 has a fuel injection nozzle means 4 for injecting fuel F into the swirl combustion chamber 3. The fuel injected by the fuel injection nozzle means 4 is mixed with air or atomized at a rate increased by the swirl S, and the atomized fuel is ignited by the heat produced by the compressed air and combusted.

If an ignition delay is increased in the diesel engine, then a diesel knock is produced wherein fuel injected during the ignition delay is formed into a pre-mixture creating a high energy condition entirely in the swirl combustion chamber 2, which allows a number of flame cores to be produced and at the same time causes an explosive combustion to go on. The quick combustion increases the rate of a pressure buildup within the cylinder thereby to produce a large pressure wave which impinges upon the piston and cylinder wall, thus generating noise and vibrations. While the engine is idling at a low cooling water temperature, immediately after the engine has started, the temperature of the overall engine is low, and the fuel has poor ignitability, so that the engine is more likely to suffer from knocking. Such engine knocking is also undesireable because it is felt by the driver.

To prevent diesel engine knocking, the ignition delay can be shortened by promoting atomization of the injected fuel as assisted by the swirl S. The reduced ignition delay can increase the fuel ignitability in the overall swirl combustion chamber 2 and reduce noise considerably. However, only an attempt to improve the fuel ignitability fails to suppress the quick fuel combustion sufficiently and also noise generation since a large amount of fuel is atomized to produce an air-fuel mixture even within the shortened ignition delay.

SUMMARY OF THE INVENTION

In an effort to overcome the above problem, the diesel engine as shown in FIG. 2 has been proposed by the inventors herein. The diesel engine of FIG. 2 has a swirl combustion chamber 2 including a fuel injection nozzle means 8 having a primary injection port 6 and a secondary injection port 7 branched from the primary injection port 6. When a reduced amount of fuel is required for a low load such as upon idling, a valve body 9 is lifted which while preventing fuel from being injected from the primary injection port 6, allows secondary fuel f to be injected from the secondary injection port 7. The secondary injection port 7 is positioned downstream of the primary injection port 6 in the direction in which the swirl S flows, and is directed so as to open toward a wall surface 10 of the swirl combustion chamber 2. The secondary fuel f injected from the secondary injection port 7 is attached as a fuel film L to the wall surface 10, and injected fuel scattered around the fuel film L is atomized into an air-fuel mixture by the swirl S. This arrangement prevents an ignition delay, and allows fuel combutions started from a flame core to be propagated slowly for slow fuel combustion.

With the above proposal, however, the secondary injection port 7 is remotely spaced from the wall surface 10 of the swirl combustion chamber 2. The secondary fuel f tends to be trapped in the swirl S before reaching the wall surface 10, with the result that a large amount of fuel will be atomized to form an air-fuel mixture, and undesired quick fuel combustion can not sufficiently be suppressed.

It is an object of the present invention to provide a diesel engine in which the period of an ignition delay is shortened under a low load such as upon idling and the atomization of a secondary flow of injected fuel is slowed for allowing better vaporized fuel combustion on a wall surface, so that fuel combustion can be slowed to greatly reduce noise and vibrations.

To achieve the above object, there is provided a diesel engine having a cylinder head, an auxiliary combustion chamber defined in the cylinder head, an atomization passage communicating with the auxiliary combustion chamber, and a fuel injection nozzle means mounted in the cylinder head and having a primary injection port opening into the auxiliary combustion chamber and a secondary injection port opening toward an inner wall surface of the atomization passage, the arrangement being such that when the diesel engine is under a low load, fuel is injected from the secondary injection port toward the inner wall surface of the atomization passage while fuel is prevented from being injected from the primary injection port, for thereby causing fuel to flow along an inner wall surface of the auxiliary combustion chamber, which is positioned downstream in the direction in which a swirl flows.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 3:
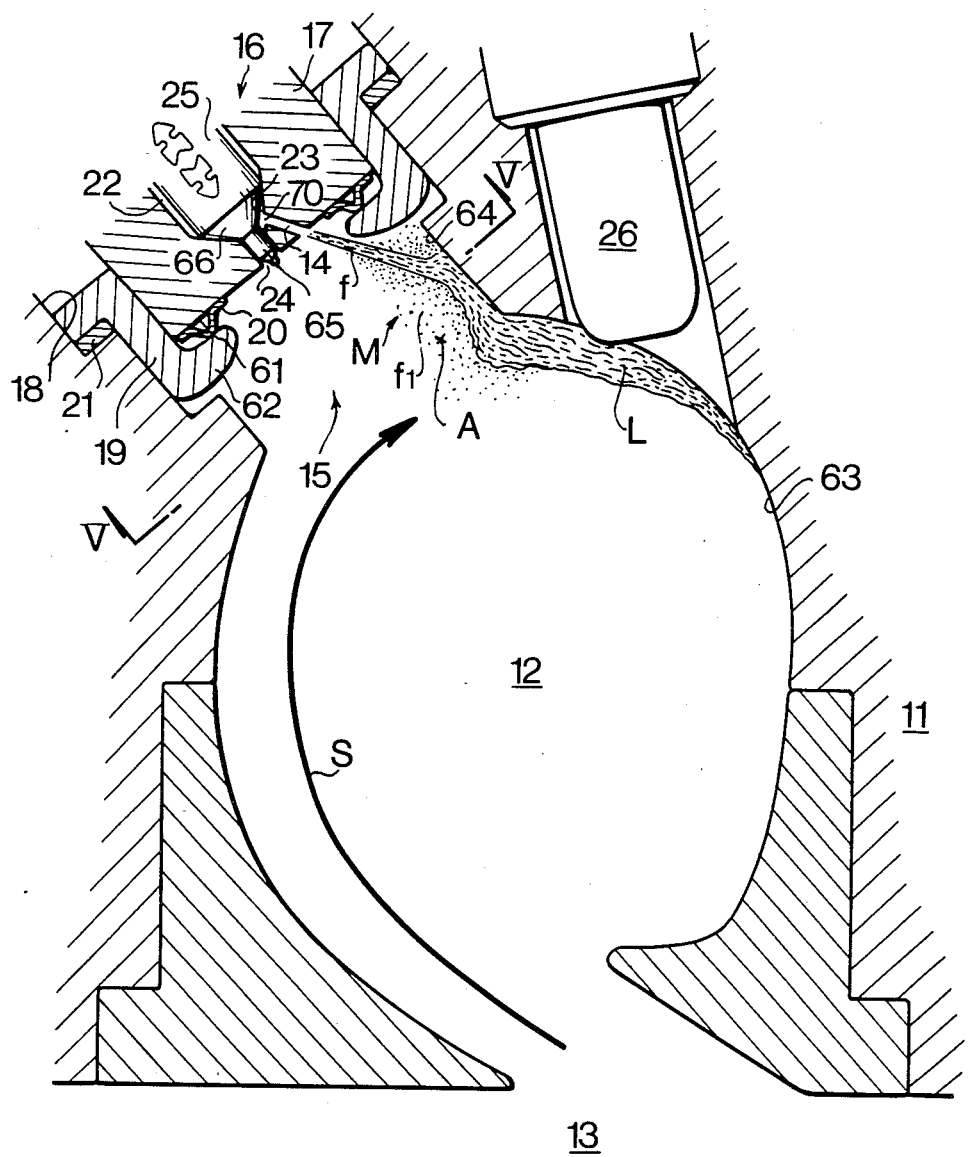
FIG. 3 is a fragmentary cross-sectional view of a diesel engine according to a preferred embodiment of the present invention.

FIG. 3 illustrates a diesel engine according to a preferred embodiment of the present invention. The diesel engine includes a cylinder head 11 which is mounted on a cylinder block (not shown) and having a swirl combustion chamber 12 as an auxiliary combustion chamber defined therein. Compressed air flows from a main combustion chamber 13 into the swirl combustion chamber 12 to form a swirl S therein. A cylindrical atomization passage 15 is defined in the cylinder head 11 laterally of the swirl combustion chamber 12 in communication therewith. The atomization passage 15 serves to prevent secondary fuel f injected from a fuel injection nozzle means 16 (described later) from being immediately disturbed by the swirl S. The fuel injection nozzle means 16 is disposed in the atomization passage 15 for injecting fuel into the swirl combustion chamber 12. The fuel injection nozzle means 16 includes a nozzle body 17 serving as an outer shell and mounted by a heat shield 19 in a cylindrical attachment hole 18 communicating with the atomization passage 15. The fuel injection nozzle means 16 has a front face 61 engaged by an annular inwardly turned flange 62 of the heat shield 19. The heat shield 19 is interposed between the nozzle body 17 and the cylinder head 11 which is heated to a high temperature for preventing thermal transfer therebetween. Designated at 20, 21 are gaskets.

Figure 4:
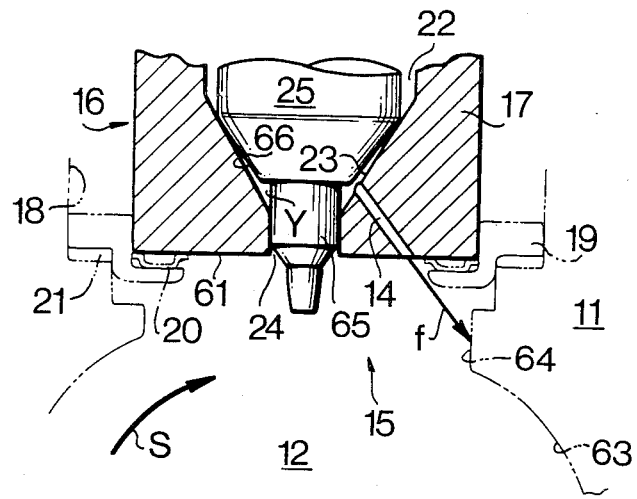
FIG. 4 is a fragmentary cross-sectional view of a portion of the diesel engine shown in FIG. 3.

As illustrated in FIG. 4, a fuel chamber 22 is defined in the nozzle body 17 for being supplied with fuel under pressure from a fuel pump (not shown). The fuel chamber 22 communicates with a primary injection port 24 through a conical valve seat 23 tapered progressively toward the swirl combustion chamber 12, the primary injection port 24 serving to inject fuel into the swirl combustion chamber 12. A secondary injection port 14 of a relatively small diameter is defined in the nozzle body 17 and extends from the primary injection port 24 radially outwardly in the nozzle body 17.

The primary injection port 24 is formed axially of the nozzle body 17 for directing fuel centrally in the atomization passage 15 toward the center of the swirl combustion chamber 12. The secondary injection port 14 is not directed parallel to the axis of the nozzle body 17, but is inclined radially outwardly in the nozzle body 17. The secondary injection port 14 opens toward an inner wall surface 64 of the atomization passage 15 which is contiguous to an inner wall surface of the swirl combustion chamber 12 which is positioned downstream in the direction in which the swirl S flows. The fuel injection nozzle means 16 also includes a liftable valve body 25 disposed in the nozzel body 17.

The valve body 25 is mainly composed of a throttle body 65 in the form of a shaft for opening and closing the primary injection port 24 and a conical seating portion 66 for opening and closing the fuel chamber 22. The throttle body 65 is inserted in the primary injection port 24 to close the same for preventing fuel from being injected therefrom when the required amount of fuel is small and the valve body 25 is lifted only a small distance, that is, when the engine is subjected to a small load such as upon idling. The seating portion 66 is seated on the valve seat 23 in circumferential line-to-line contact therewith for opening and closing the fuel chamber 22 in response to movement of the valve body 25 at all times.

The secondary injection port 14 has an inlet 70 communicating with a gap (suction volume) Y defined between the valve seat 22 and the seating portion 66 and supplied with fuel from the fuel chamber 22 even when the primary injection port 24 is closed. When the amount of fuel injected is small as during idling, the fuel injection nozzle means 16 injects secondary fuel f only through the secondary injection port 14.

Figure 5:
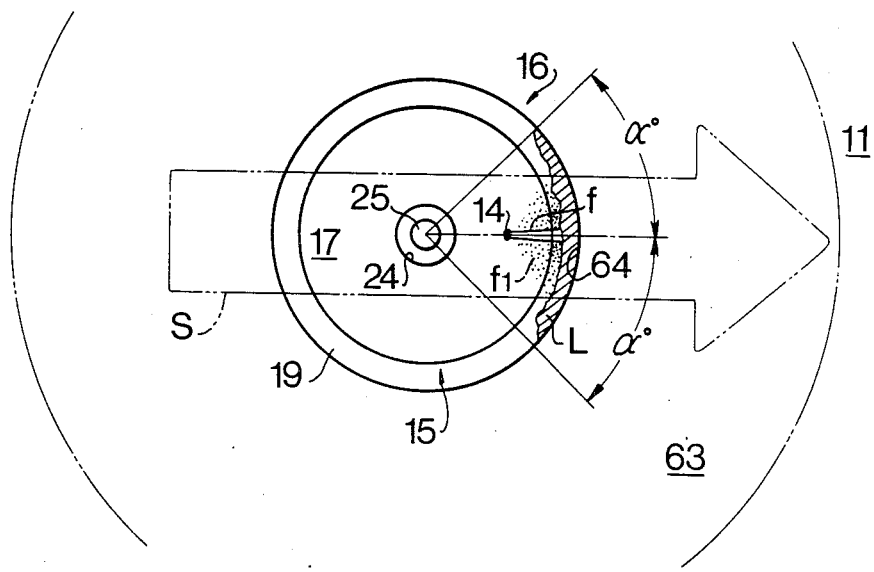
FIG. 5 is a cross-sectional view taken along line V—V of FIG. 3.

As illustrated in FIGS. 3, 4, and 5, the secondary injection port 14 is defined closely to the inner wall surface 64 of the atomization passage 15 so that injected secondary fuel f will flow along the inner wall surface 63 of the swirl combustion chamber 12 which is downstream in the direction of flow of the swirl S generated in the swirl combustion chamber 12. The inner wall surface 64 is formed as a smooth surface for atomizing a portion f1 of the injected fuel f injected from the secondary injection port 14 and impinging upon the inner wall surface 64, the fuel portion f1 being atomized under an impact of its impingement upon the inner wall surface 64 into an air-fuel mixture by the swirl S for contribution to fuel igntion. Most remaining secondary fuel f is attached to the inner wall surface 64 immediately after the fuel hits the inner wall surface 64, and flows as a fuel film L along the inner wall surface 63 of the swirl combustion chamber 12. Fuel flow L is thus prevented from being atomized into an air-fuel mixture. More specifically, quick fuel ignition is achieved by the secondary fuel portion f1 which impinges upon the inner surface 64, is scattered and atomized into an air-fuel mixture by being assisted by the swirl S. Fuel combustion following the ignition thus started is slowed by the combustion of vaporized fuel from the fuel film L flowing along the inner wall surface 63. With the illustrated embodiment, as shown in FIG. 5, the secondary injection port 14 of the fuel injection nozzle means 16 opens toward the inner wall surface 64 so that the secondary fuel f injected from the secondary injection port 14 will flow along the inner wall surface, 63 within an angle $\alpha°$ which ranges up to 45° on each side of the fuel injecting direction within a fuel injection sector zone having a vertex aligned with the primary injection port 24. Therefore, the secondary fuel f and the swirl S will not flow counter to each other, and the fuel combustion is slowed as much as possible. The secondary injection port 14 is of a relatively small diameter for reducing the diamter of particles of the injected fuel f so that the fuel film L will easily be vaporized. More specifically, the fuel film L which flows downstream in the direction of flow of the swirl S is effective in suppressing fuel atomization, but too much suppression of fuel atomization would allow fuel to be discharged as unburned. To eliminate this problem, the fuel film L is thinned and the diameter of fuel particles is reduced to assist a certain degree of fuel vaporization. By suitably balancing the suppression of fuel atomization and the promotion of fuel atomization, fuel combustion can be slowed down while reducing the generation of harmful pollutants such as HC.

Desigated in FIG. 3 at 26 is a glow plug for starting the diesel engine. Normally, the glow plug would extend deeply into the swirl combustion chamber 12 for heating fuel which is injected to hit the glow plug. According to the illustrated embodiment, however, the glow plug 26 has its tip end disposed along the inner wall surface 63 downstream in the direction of flow of the swirl S for permitting the tip end of the glow plug 26 to contact the fuel film L. This arrangement can increase the durability of the glow plug 26 as it is not exposed to high pressure and temperature during operation of the diesel engine.

Turning now to a description of the operation of the diesel engine of the present invention, when the diesel engine operates under a low load such as upon idling, the valve body 25 is lifted to allow the seating portion 66 to open the fuel chamber 22 for supplying fuel into the suction volume Y. At this time, the throttle body 65 closes the primary injection port 24 to prevent the injection of primary fuel therefrom. Therefore, fuel is injected as secondary fuel f only from the secondary injection port 14. The injected secondary fuel f immediately impinges upon the inner wall surface 64, and a portion f1 of the fuel is atomized into the swirl combustion chamber 12, while most remaining fuel f flows as a wide thin fuel film M in a certain angle range on the inner wall surface 63. The fuel film L thus formed spreads in the angle $a°$ ($\approx 45°$) on each side of the direction of injection of the secondary fuel f in the sector zone starting from the primary injection port 24, and flows downstream in the same direction as that of the swirl S. Therefore, the fuel film L will not be peeled off the inner wall surface 63 by the swirl S of compressed air at high temperature. However, fuel atomization from the fuel film L will not entirely be prevented. Since the secondary injection port 14 is of a small diameter, fuel particles injected therefrom are relatively small. The fuel from the secondary injection port 14 flows as a thin film in a wide angle range. Consequently, the fuel film L is subject to being vaporized with ease. As described above, an ignition point A is generated early to start fuel combustion by the air-fuel mixture of the secondary fuel f1 scattered into the swirl combustion chamber 12, and thereafter fuel which progressively vaporized from the fuel film L on the inner wall surface 63 is combusted to achieve a slow combustion process. Heretofore, the period of an igntion delay was relatively long (T2) as indicated by the broken line a in FIG. 6, thus permitting a high energy condition throughout the cylinder which allows explosive fuel combustion to go on. With the present invention, however, the pressure within the cylinder varies as indicated by the solid line b in FIG. 6, reducing the period of an ignition delay (T1) and suppressing a pressure buildup in the cylinder, so that noise and vibrations can greatly be reduced.

As described above, since the secondary injection port 14 is directed so as to be open toward the inner wall surface 64 of the atomization passage 15, the secondary fuel f injected only from the secondary injection port 14 under a low engine load chiefly upon idling impinges upon the inner wall surface 64 of the atomization passage 15. The portion f1 of the secondary fuel f impinging upon the inner wall surface 64 is repelled and turned into fine particles as shown at M in FIG. 3. The fine fuel particles are then vaporized easily with the heat of intake air compressed by the piston, and then ignited and combusted. Therefore, the ignition timing is advanced and the unwanted ignition delay is prevented.

The remaining secondary fuel f first impinges upon the inner wall surface 64 and then flows as the fuel film L along the inner wall surface 63 downstream in the direction of flow of the swirl S in the swirl combustion chamber 12. The fuel film L is then gradually vaporized and combusted at a slow rate.

Figure 6:
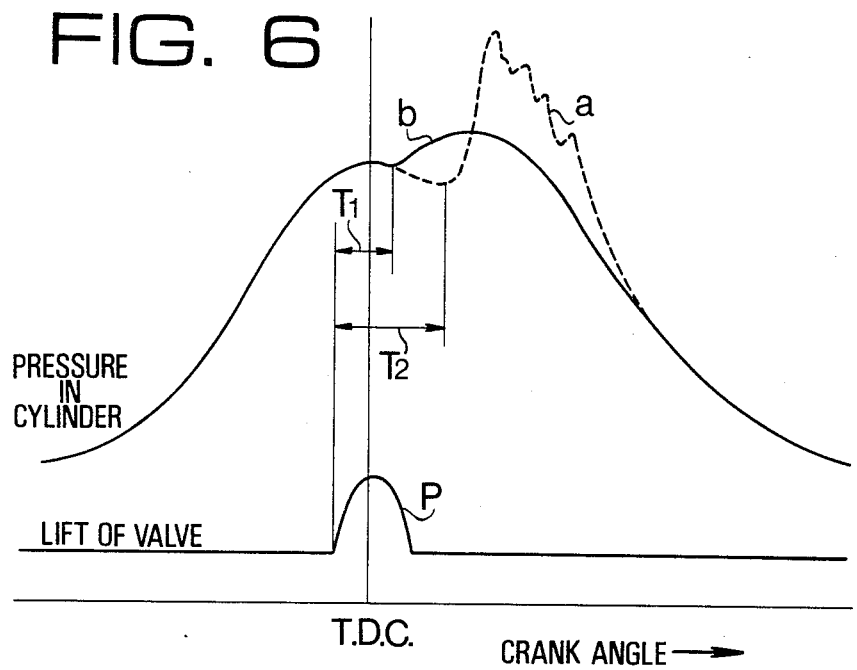
FIG. 6 is a graph showing a comparison between combustion processes according to the present invention and the prior art.

Desigated at P in FIG. 6 is a lift of the valve body at the time the engine is subjected to a low load such as upon idling.

Figure 1:
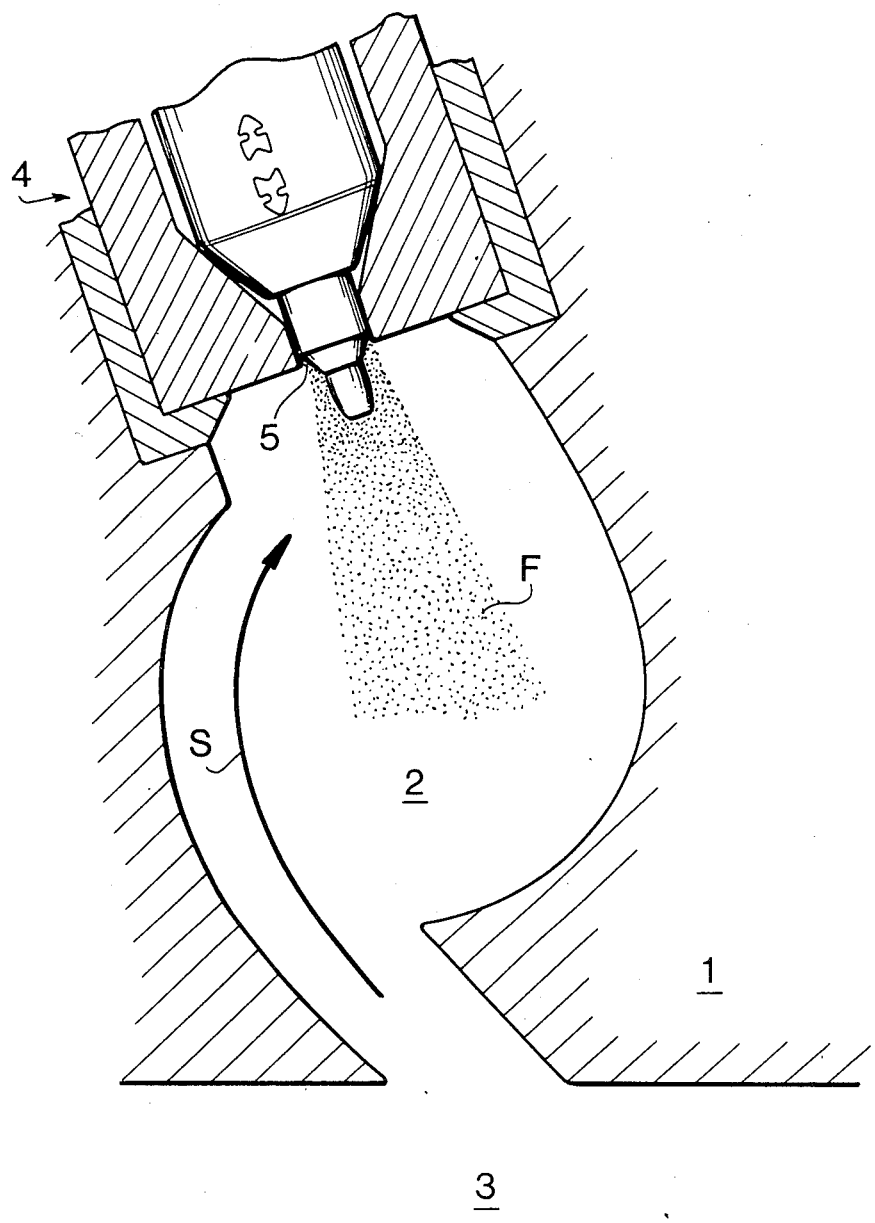
FIG. 1 is a fragmentary cross-sectional view of a conventional, prior art diesel engine.
Figure 2:
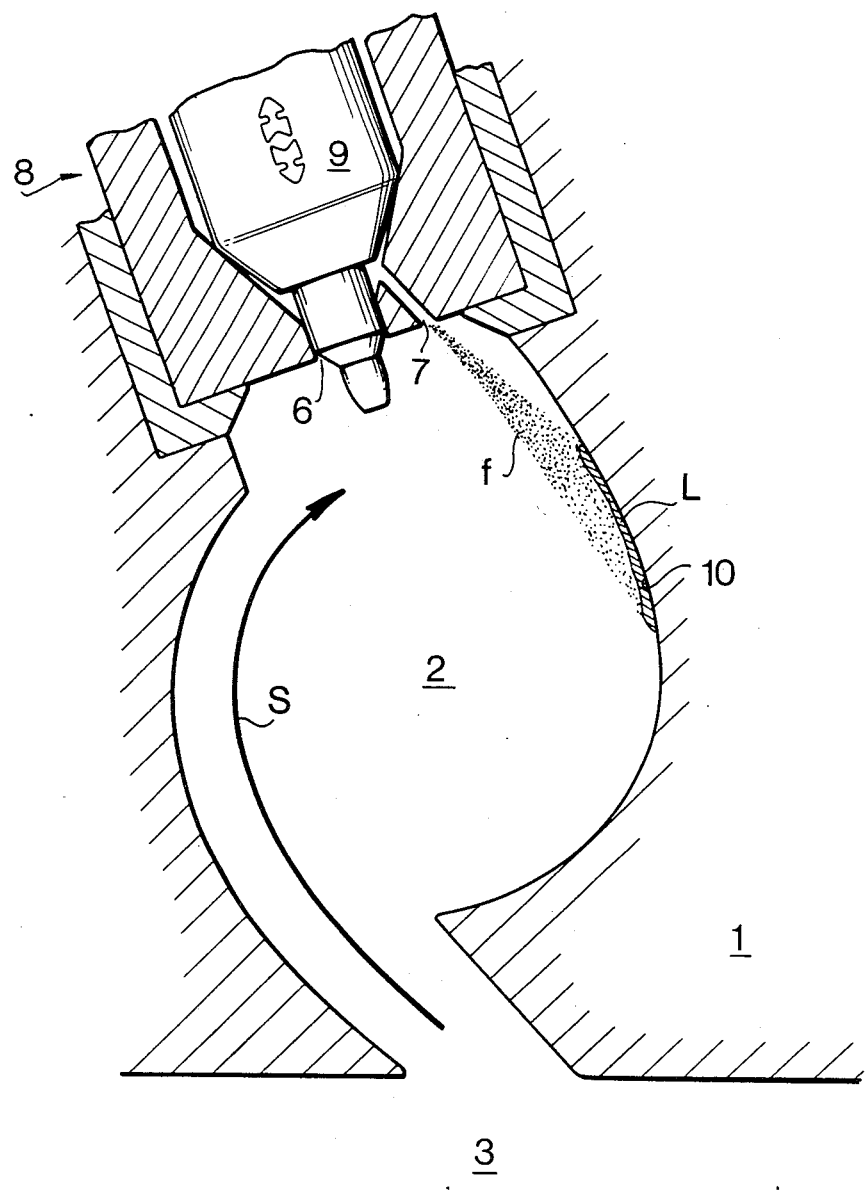
FIG. 2 is an improved version of the fragmentary cross-sectional view of a diesel engine shown in FIG. 1.
Figure 7:
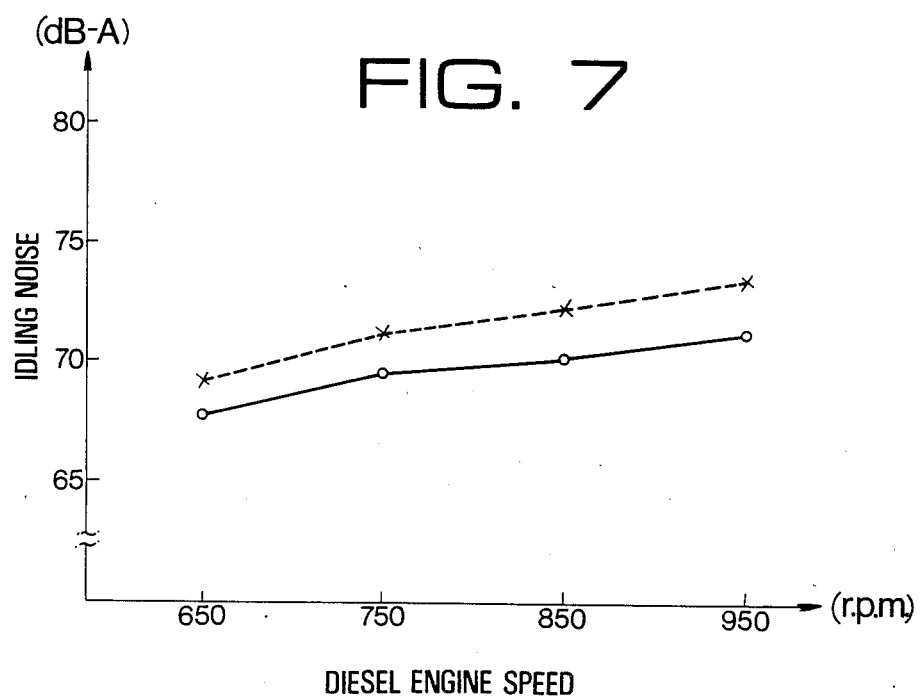
FIG. 7 is a graph showing measured values of noise produced at various engine speeds of the engine according to the present invention and of the conventional engine.

FIG. 7 shows measurements of noise picked up at a position 1 m spaced leftward from engines while they operate under a low load (water temperature: 80° C.). Measured values x and o are respectively indicative of noise levels produced by the conventional engine shown in FIG. 1 and the engine of the invention shown in FIG. 3. The engine of the present invention achieved a noise reduction by about 2 dB with respect to the conventional engine.

The fuel film L flowing along the inner wall surface 63 is thin and composed of small particles, and hence can suppress harmful pollutants such as HC discharged from the engine.

When the engine operates under normal and high loads, the valve body 25 opens the primary injection port 24 to inject fuel therefrom which is atomized into an air-fuel mixture at a rate promoted by the swirl S for fuel combustion. At this time, fuel f is also injected from the secondary injection port 14. Consequently, a portion of the entire fuel injected serves to achieve slow fuel combustion for thereby reducing noise to a lower level than would be if the entire fuel were atomized from the primary injection port 24 to form an air-fuel mixture.

Furthermore, the inner surface 64 and the secondary injection port 14 which face the swirl combustion chamber 12 are located closely to each other to prevent the secondary fuel f from being trapped in the swirl S before the secondary fuel f impinges upon the inner wall surface 64, whereby unwanted quick fuel combustion can be prevented.

The fuel injection nozzle means 16 employed in the present invention is similar to a so-called "pinteux nozzle" which ejects fuel for improved ignition before fuel is ejected from the primary injection port 14, but differs entirely from the pinteux nozzle in operation and advantages. The pinteux nozzle has its secondary injection port directed upstream in the direction of flow of a swirl for ejecting fuel before fuel is ejected from the primary injection port so that the formation of an air-fuel mixture is promoted for improved fuel ignition. However, the secondary injection port 14 of the fuel injection nozzle means 16 of the invention serves to eject fuel as upon engine idling, and to form a fuel film L along the inner wall surface 63 downstream in the direction of flow of the swirl S for suppressing the formation of an air-fuel mixture.

The present invention has the following advantages:

(1) The secondary injection port for injecting fuel when the engine is under a low load such as upon idling is directed toward the inner wall surface of the atomization passage opening into the auxiliary combustion chamber, and fuel injected from the secondary injection port is caused to flow as a fuel film along the inner wall surface of the auxiliary combustion chamber downstream in the direction of flow of the swirl generated in the auxiliary combustion chamber. With this arrangement, progressive slow fuel combustion can be acheived while suppressing excessive fuel vaporization, and hence noise and vibrations can greatly be reduced.

(2) A portion of the fuel injected from the secondary injection port and impinging upon the inner wall surface of the atomization passage forms an air-fuel mixture necessary for igniting fuel, so that early fuel ignition can be accomplished.

(3) The arrangement of the invention can be achieved without involving a substantial cost increase simply by directing the secondary injection port of the fuel injection nozzle means toward the inner wall surface of the atomization passage. Therefore, the construction of the invention is highly practical.

Although a certain preferred embodiment has been shown and described, it should be understood that many changes and modifications may be made therein without departing from the scope of the appended claims.

What is claimed is:

1. A diesel engine comprising a cylinder head, an auxiliary combustion chamber defined in said cylinder head and having an inner wall surface, an atomization passage communicating with said auxiliary chamber and having an inner wall surface, and a fuel injection nozzle means in said cylinder head and having a primary injection port opening into said auxiliary combustion chamber and a secondary injection port opening toward said inner wall surface of said atomization passage, said fuel injection means injecting fuel only through said secondary injection port while keeping said primary injection port closed when said diesel engine is under a low load, said atomization passage being defined by a depression in the inner wall surface of said auxiliary combustion chamber and disposed between said auxiliary combustion chamber and said fuel injection nozzle means.

2. A diesel engine according to claim 1, wherein said fuel injection nozzle means ejects fuel from said secondary injection port toward said inner surface of said atomization passage for allowing fuel to flow along said inner wall surface of said auxiliary combustion chamber downstream in the direction of flow of a swirl generated therein.

3. A diesel engine according to claim 1, wherein said fuel injection nozzle means ejects fuel from said secondary injection port along said inner wall surface of said auxiliary combustion chamber downstream in the direction of flow of a swirl generated therein, within an angle ranging up to about 45° on each side of the direction of the fuel injected from said secondary injection port within a sector zone having a vertex aligned with said primary injection port.

4. A diesel engine comprising a cylinder head, an auxiliary combustion chamber defined in said cylinder head and having an inner wall surface, an atomization passage communicating with said auxiliary combustion chamber and having an inner wall surface, and a fuel injection nozzle means in said cylinder head and having a primary injection port opening into said auxiliary combustion chamber and a secondary injection port opening toward said inner wall surface of said atomization passage, said atomization passage being defined by a depression in the inner wall surface of said auxiliary combustion chamber and disposed between said auxiliary combustion chamber and said fuel injection nozzle means, said atomization passage being positioned to cause fuel injected from said secondary injection port to impinge thereon, and allowing a portion of the impinging fuel to be scattered as samall particles and a remainder to flow along an inner wall surface of said auxiliary combustion chamber.

* * * * *